(12) United States Patent
Allen et al.

(10) Patent No.: US 9,971,668 B1
(45) Date of Patent: May 15, 2018

(54) METHOD FOR IDENTIFYING THE PERFORMANCE BOUNDS OF A TRANSMIT-RECEIVE MODULE

(71) Applicants: Jeffery C. Allen, San Diego, CA (US); Diana Arceo, San Diego, CA (US); John W. Rockway, San Diego, CA (US)

(72) Inventors: Jeffery C. Allen, San Diego, CA (US); Diana Arceo, San Diego, CA (US); John W. Rockway, San Diego, CA (US)

(73) Assignee: The United States of America as represented by Secretary of the Navy, Washington, DC (US)

(*) Notice: Subject to any disclaimer, the term of this patent is extended or adjusted under 35 U.S.C. 154(b) by 1387 days.

(21) Appl. No.: 13/894,935

(22) Filed: May 15, 2013

(51) Int. Cl.
*G06F 11/34* (2006.01)
*H04L 25/02* (2006.01)
*H01Q 1/52* (2006.01)

(52) U.S. Cl.
CPC ......... *G06F 11/3409* (2013.01); *H01Q 1/521* (2013.01); *H01Q 1/525* (2013.01); *H04L 25/0278* (2013.01)

(58) Field of Classification Search
CPC .................. G06G 17/5063; H04L 25/0278
See application file for complete search history.

(56) References Cited

U.S. PATENT DOCUMENTS

| | | | |
|---|---|---|---|
| 7,376,535 B1 | 5/2008 | Allen et al. | |
| 7,614,021 B1 | 11/2009 | Allen | |
| 7,934,190 B1 | 4/2011 | Allen | |
| 2005/0057409 A1* | 3/2005 | Choo | H01Q 1/36 343/728 |

(Continued)

OTHER PUBLICATIONS

Chen, A Decoupling Technique for Increasing the Port Isolation Between Two Strongly Coupled Antennas, IEEE Transactions on Antennas and Propagation, vol. 56, No. 12, Dec. 2008.*

(Continued)

*Primary Examiner* — Michael Dalbo
(74) *Attorney, Agent, or Firm* — SPAWAR Systems Center Pacific; Kyle Eppele; J. Eric Anderson

(57) ABSTRACT

A method for identifying performance bounds of a transmit-receive (T/R) module over a bandwidth $f_b$ when connected to an antenna, a transmitter, and a receiver all with known reflectance within the bandwidth $f_b$; measuring a raw T/R module point representing isolation and insertion loss of the T/R module when connected to the antenna, the transmitter, and the receiver without a matching circuit; plotting the raw T/R module point on a performance image graph; using a mathematical representation of a multiport matching circuit that contains no gyrators and comprises a fixed number of capacitors and inductors to approximate a Pareto front comprised of a plurality of Pareto points; and connecting each Pareto point to the raw T/R module point on the performance image graph such that the performance image becomes a visual representation of the performance bounds of a class of multiport matching circuits having capacitors and inductors.

20 Claims, 8 Drawing Sheets

(56) References Cited

U.S. PATENT DOCUMENTS

2005/0256683 A1* 11/2005 Hillermeier .......... G05B 13/026
                                                                             703/1

OTHER PUBLICATIONS

Allen, Optimal Lossy Matching by Pareto Fronts, IEEE Transactions on Circuits and Systems—II: Express Briefs, vol. 55, No. 6, Jun. 2008.*

Wohlers, Ronald M.; Lumped and Distributed Passive Networks, A Generalized and Advanced Viewpoint; Chapter 3, Section 3.1, Academic Press, New York, 1969.

Allen, Rockway, Arceo; Wideband Multiport Matching Phase I: Single-Feed Multiport Antennas, SPAWAR Technical Report 1972; Sep. 2008.

* cited by examiner

# METHOD FOR IDENTIFYING THE PERFORMANCE BOUNDS OF A TRANSMIT-RECEIVE MODULE

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 101731.

BACKGROUND OF THE INVENTION

Transmit-receive (T/R) modules (e.g., circulators and ferrite pucks) are often used to connect a transmitter ($T_X$) and a receiver ($R_X$) to a common antenna. In theory, T/R modules allow the transmitter and receiver to simultaneously operate using the same antenna. In practice, however, ideal T/R modules do not exist that can simultaneously provide complete transmitter-receiver isolation and prevent transmitter-antenna signal power loss and/or antenna-receiver signal power loss. Consequently, matching circuits are often employed to manage the shortcomings of non-ideal T/R modules. Given an existing T/R module, antenna, transmitter, and receiver, can an existing matching circuit be improved or can a new matching circuit be designed to meet certain performance criteria? Prior art solutions required extensive experiments and trial-and-error efforts to answer these questions. In the prior art, a large literature exists on designing and tuning matching circuits for a given T/R module in an effort to maximize isolation and minimize insertion loss across a narrow frequency band. A need exists for a method of identifying the extent to which isolation may be maximized and insertion loss may be minimized for a given T/R module, antenna, transmitter, and receiver.

SUMMARY

Disclosed herein is a method for identifying performance bounds of a transmit-receive (T/R) module over a bandwidth $f_b$. First, an antenna, a transmitter, and a receiver all with known reflectance within the bandwidth $f_b$ are provided. Next, the isolation between the transmitter and the receiver, the insertion loss from the transmitter to the antenna, and the insertion loss from the antenna to the receiver are measured when the antenna, transmitter, and receiver are connected to the T/R module without a matching circuit. The next step provides for plotting the minimum measured isolation and the maximum measured insertion loss on a performance image graph as a raw T/R module point. The next step provides for mathematically representing a multiport matching circuit configured to be connected to the T/R module, the antenna, the transmitter, and the receiver, wherein the matching circuit contains no gyrators and comprises a fixed number $N_C$ and $N_L$ of capacitors and inductors respectively. The next step provides for using the mathematical representation of the matching circuit to approximate a Pareto front comprised of a plurality of Pareto points. The next step provides for connecting each Pareto point to the raw T/R module point on the performance image graph such that the performance image becomes a visual representation of the performance bounds of a class of multiport matching circuits having $N_C$ capacitors and $N_L$ inductors.

The method for identifying the performance bounds of a transmit-receive (T/R) module over a given bandwidth $f_b$ may also be described in the following manner. First a T/R module is provided. The next step provides for identifying a given antenna, a given transmitter, and a given receiver that are to be connected to the T/R module. In this embodiment, the antenna, the transmitter, and the receiver all have known operational characteristics within the bandwidth $f_b$. The next step provides for parameterizing a multiport matching circuit by generating M submanifolds of orthogonal scattering matrices for the multiport matching circuit. The multiport matching circuit contains no gyrators and comprises a fixed number $N_C$ of capacitors and a fixed number $N_L$ of inductors. The next step provides for sweeping over the submanifolds of orthogonal scattering matrices to identify isolation and insertion loss data for each of a plurality of Pareto points. The next step provides for displaying a Pareto front comprised of the Pareto points on a performance image plot showing the possible isolation and insertion loss tradeoffs for a class of multiport matching circuits having $N_C$ capacitors and $N_L$ inductors when connected to the T/R module, the given antenna, the given transmitter, and the given receiver.

The method for identifying the performance bounds of a transmit-receive (T/R) module over a given bandwidth $f_b$ may also be described in the following manner. In the first step, a T/R module is provided. The next step provides for identifying a given antenna, a given transmitter, and a given receiver all with known operational characteristics within the bandwidth $f_b$. The next step provides for representing mathematically with matrices a class of lumped, lossless, gyrator-free, multiport matching circuits having $N_C$ capacitors and $N_L$ inductors. The next step provides for exploiting the matrices to simultaneously solve insertion loss and isolation objective functions to determine transmitter-receiver isolation data, transmitter-antenna insertion loss data, and antenna-receiver insertion loss data for the class of multiport matching circuits. The next step provides for populating a performance image with a Pareto front comprised of a plurality of Pareto points such that the performance image displays the possible isolation and insertion loss tradeoffs for the class of multiport matching circuits having $N_C$ capacitors and $N_L$ inductors when connected to the T/R module, the antenna, the transmitter, and the receiver.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
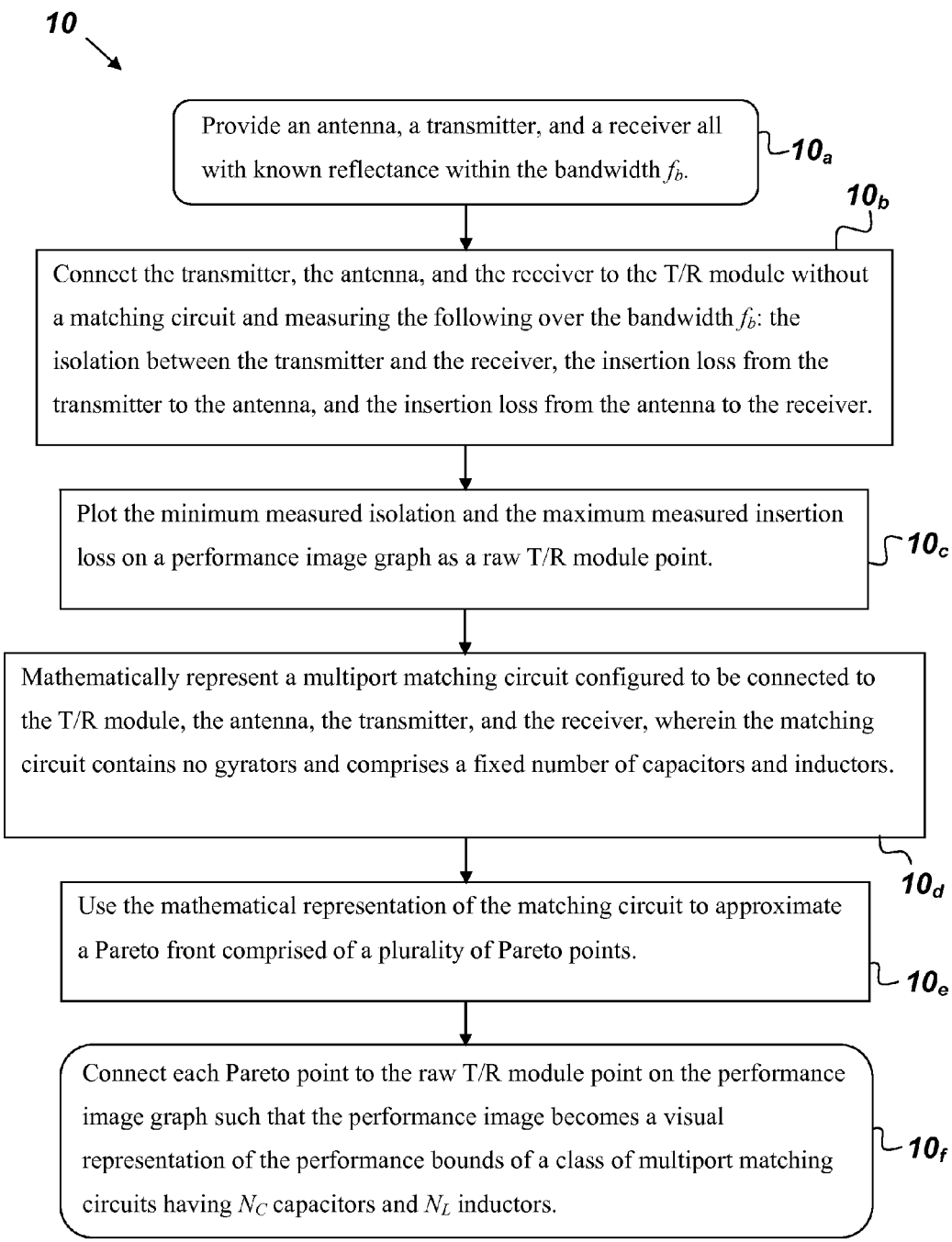
FIG. 1 is a flowchart displaying the steps of a method for identifying the performance bounds of a T/R module.

FIG. 1 is a flowchart of a method 10 for identifying the performance bounds of a given transmit-receive (T/R) module over a bandwidth $f_b$. Step $10_a$ provides an antenna, a transmitter, and a receiver all with known reflectance within the bandwidth $f_b$. Step $10_b$ connects the transmitter, the antenna, and the receiver to the T/R module without a matching circuit and, once connected, measures the following over the bandwidth $f_b$: the isolation between the transmitter and the receiver, the insertion loss from the transmitter to the antenna, and the insertion loss from the antenna to the receiver. Step $10_c$ plots the minimum measured isolation and the maximum measured insertion loss on a performance image graph as a raw T/R module point. Step $10_d$ involves mathematically representing a multiport matching circuit configured to be connected to the T/R module, the antenna, the transmitter, and the receiver, wherein the matching circuit contains no gyrators and comprises a fixed number of capacitors and inductors. Step $10_e$ uses the mathematical representation of the matching circuit to approximate a Pareto front comprised of a plurality of Pareto points. Step $10_f$ connects each Pareto point to the raw T/R module point on the performance image graph such that the performance image becomes a visual representation of the performance bounds of a class of multiport matching circuits having $N_C$ capacitors and $N_L$ inductors.

Figure 2:
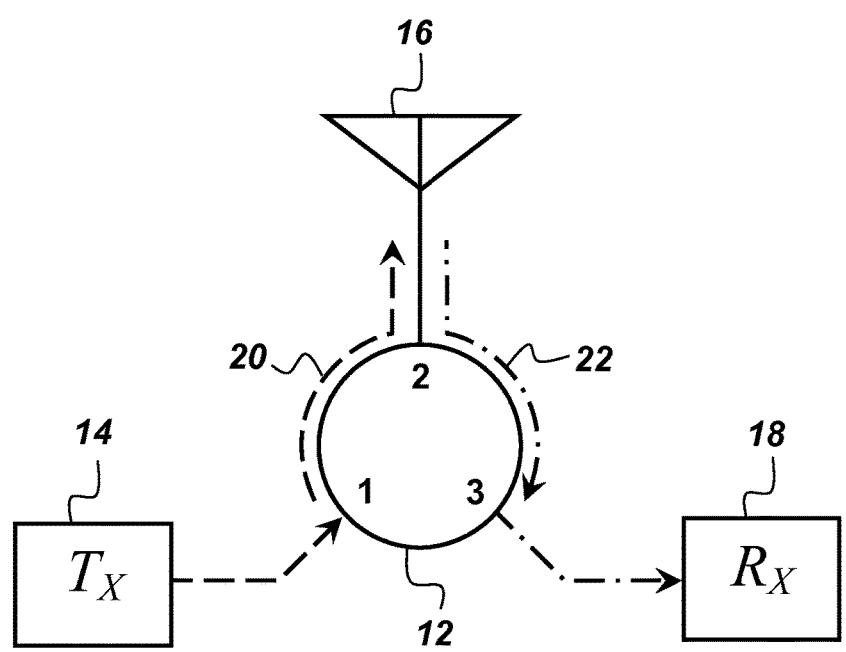
FIG. 2 is a depiction of a three-port T/R module connected to an antenna, a transmitter and a receiver.

FIG. 2 is a depiction of an example embodiment of a T/R module 12. In this embodiment, the T/R module 12 is an ideal three-port circulator. The T/R module 12 has Ports 1, 2, and 3 respectively connected to a transmitter 14, an antenna 16 and a receiver 18. In the ideal embodiment of the T/R module 12 depicted in FIG. 2 all of the power, portrayed by the dashed arrows 20, from transmitter 14 flowing into Port 1 is channeled to Port 2 and subsequently radiated from the antenna 16. In a similar fashion, all the power, portrayed by the dot-dashed arrows 22, received by the antenna 16 is directed into Port 2 and routed to the receiver 18 on Port 3. The ideal embodiment of the T/R module 12 prevents any power from flowing from Port 3 to Port 2 or from Port 2 to Port 1. However, in the real world ideal T/R modules do not exist.

Figure 3:
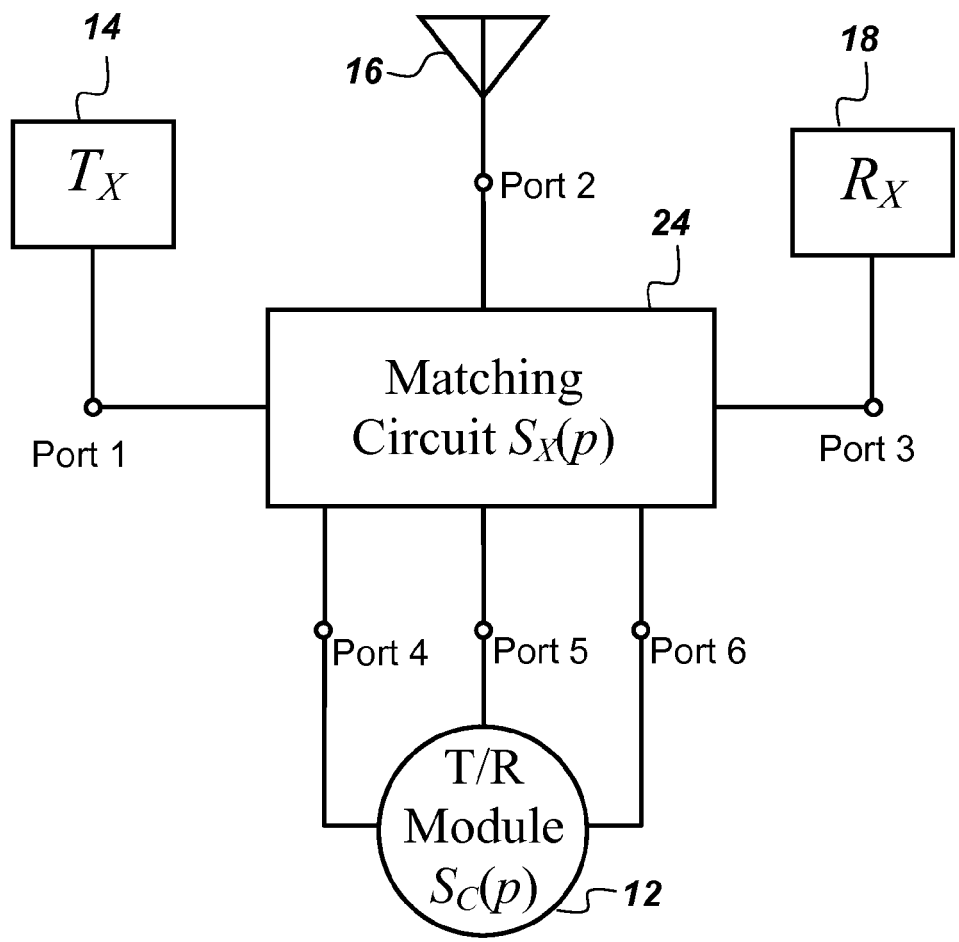
FIG. 3 is an example of a three-port T/R module connected to an antenna, a transmitter and a receiver via a multi-port matching circuit.

FIG. 3 is an example of a non-ideal/real-world, three-port T/R module 12 connected to the antenna 16, the transmitter 14, and the receiver 18 via a multi-port matching circuit 24. The purpose of the matching circuit 24 is to mitigate the effects of power flowing the wrong way (e.g., from the transmitter into the receiver) in the T/R module 12. The performance bound identification method 10 allows one to determine if an existing matching circuit 24 can be improved. Further, method 10 allows one to determine if given a certain antenna 16, receiver 18, transmitter 14, and T/R module 12 a matching circuit 24 can be designed to meet predefined performance criteria. In other words, method 10 can help determine whether or not performance standards can be met with the given equipment.

FIG. 3 illustrates a T/R module 12 design where a given "raw" T/R module 12 (in this case a three-port circulator) is attached to three ports of a 6-port matching circuit 24. The transmitter 14, receiver 18, and antenna 16 are also given and connected to the remaining ports of the matching circuit 24. The T/R matching problem seeks to design a lumped, lossless, gyrator-free multiport that maximizes the isolation between the transmitter 14 and receiver 18, minimizes the power lost from the transmitter 14 to the antenna 16, and minimizes the power lost from the antenna 16 to the receiver 18. Method 10's mathematical representation of the matching circuit 24 contains no gyrators, since, in theory, ideal gyrators can realize a perfect T/R module and, in practice, ideal gyrators do not exist. Therefore, ideal gyrators are omitted from the multiport matching circuit class to avoid converging to this impractical solution.

Figure 4:
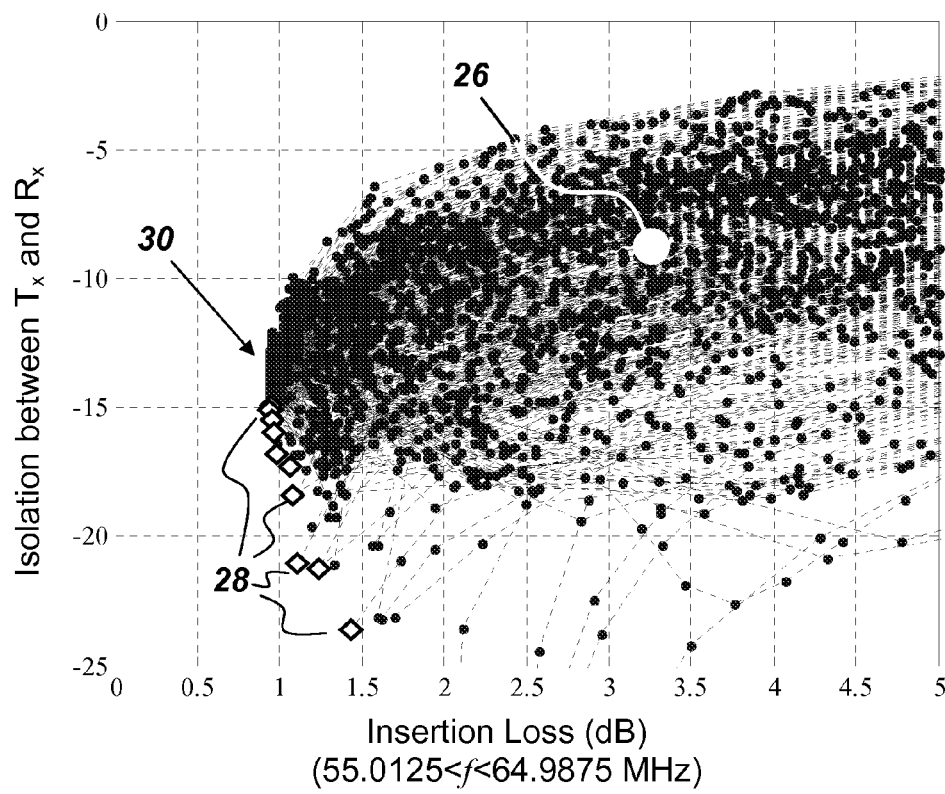
FIG. 4 is an example of a performance image plot.

FIG. 4 is an example of a performance image generated by method 10. Method 10 may be used to compute the performance images of any given T/R module 12 (such as a ferrite puck or a circulator) over the entire class of all lumped, lossless, gyrator-free multiport matching circuits 24 that contain a fixed number of inductors and capacitors. These performance images reveal the best possible insertion loss and isolation that a class of multiport matching circuits 24 can deliver for the given load. These performance images allow an engineer to graphically assess the overall tradeoff between the insertion loss and the isolation in order to (i) select multiport matching circuits 24 to realize improved T/R module performance; (ii) enlarge the class of multiport matching circuits 24 to get better T/R performance; (iii) or, cease development on the given load.

The particular performance image shown in FIG. 4 was generated by method 10 for a transmitter 14, antenna 16, and receiver 18 that all have 50 ohms impedance. The raw T/R module 12, in this case, a three-port circulator, was measured over 55 to 65 MHz. The T/R performance of the raw T/R module 12, or raw T/R module point, is marked by the large, white dot 26 at 3.3 dB insertion loss and −9 dB isolation over 55 to 65 MHz. The −9 dB isolation is the minimum isolation the raw circulator delivers over this frequency band—some frequencies will block the transmitter 14's power from the antenna 16 with greater loss but at least one frequency reduces the transmitter 14's power by 9 dB. The 3.3 insertion loss is the maximum loss over the frequency band from either the transmitter 14 to the antenna 16 or the antenna 16 to the receiver 18—some frequencies will allow more power to flow from transmitter 14 to the antenna 16 or the antenna 14 to the receiver 18 but at least one frequency reduces one of these power flows by 3.3 dB.

Referring still to FIG. 4, the blue dots and connecting lines mark the performance of the class of lossless, gyrator-free matching multiport matching circuits 24 containing one inductor and two capacitors. The performance image in FIG. 4 shows that multiport matching can improve the T/R performance of the raw circulator. Many of the minimal elements, or Pareto points 28, of this performance image are marked by the white diamonds. The profile of the Pareto points 28 defines a Pareto front 30. These Pareto points 28 mark the limits of the T/R performance attainable from this class of matching circuits 24. For example, there is a matching circuit 24 that can deliver slightly less than 1 dB of isolation at −15 dB insertion loss. As can be seen from the performance image, no other matching circuit 24 can deliver less insertion loss. If the 1 dB insertion loss is too great for a given T/R application, the circuit designer must select other combinations of inductors and capacitors. If slightly more than 1 dB insertion loss can be tolerated, the T/R performance image shows that isolation exceeding −20 dB is possible. Regardless of the specific design requirements, the T/R performance image shows what matching performance is available for the class of the lossless, gyrator-free matching multiport matching circuits 24 containing a fixed number of inductors and capacitors.

For a given transmitter 14, receiver 16, antenna 18, and T/R module 12, connected as shown in FIG. 3, method 10 estimates the T/R performance image by sweeping over the scattering matrices of the lumped, lossless, gyrator-free multiport matching circuits 24 that contain a fixed number of inductors and capacitors. These scattering matrices are parameterized by submanifolds of the orthogonal matrices. Consequently, the T/R performance images are generated by sweeping over each submanifold.

In the following description of method 10, the following notation applies. As used herein, the variable "p" denotes the complex frequency $p=\sigma+j\omega$, where $\sigma$ is the neper frequency in rad/s, j is the square root of −1, and $\omega$ is the radian frequency in rad/s. $N_L$ is the number of inductors in the multiport matching circuit 24; $N_C$ is the number of capacitors in the multiport matching circuit 24. The variable $d=N_L+N_C$ is called the degree of the multiport matching circuit 24. The matrix $I_d$ denotes the d×d identity matrix. The matrix $I_M$ denotes the M×M identity matrix. The matrix $S_a$ denotes an augmented scattering matrix, described below. A matrix S is called real if all its components are real numbers. An M×M matrix S is called orthogonal if S is real and $S^T S = I_M$, where $S^T$ denotes the transpose of S. A matrix $\Theta$ is called skew-symmetric if $\Theta$ is real and $\Theta^T = -\Theta$. The matrix exponential is the matrix-valued function $$\exp(\Theta) = \sum_{k=0}^{\infty} \frac{\Theta^k}{k!},$$

where "k" is an index of summation.

Multiport matching circuits 24 may be parameterized by their scattering matrices. The scattering matrix $S_X(p)$ of any lumped, lossless, gyrator-free N-port matching circuit is the N×N matrix-valued, rational function of the form:

$$S_X(p)=F(S_a,S_{LC};p)=S_{a,11}+S_{a,12}S_{LC}(p)(I_d-S_{a,22}S_{LC}(p))^{-1}S_{a,21}, \quad (1)$$

where $S_{LC}(p)$ is a diagonal scattering matrix modeling a fixed number of $N_L$ inductors and $N_C$ capacitors as:

$$S_{LC}(p) = \frac{p-1}{p+1}\begin{bmatrix} I_{N_L} & 0 \\ 0 & -I_{N_C} \end{bmatrix}, \quad (2)$$

and the augmented scattering matrix $S_a$ is a constant, orthogonal, symmetric matrix partitioned in a 2×2 block matrix:

$$S_a = \begin{bmatrix} S_{a,11} & S_{a,12} \\ S_{a,21} & S_{a,22} \end{bmatrix}; S_{a,11} \text{ is } N \times N; S_{a,22} \text{ is } d \times d. \quad (3)$$

Each augmented scattering matrix $S_a$ admits the factorization:

$$S_a = \exp(\Theta)\begin{bmatrix} I_m & 0 \\ 0 & -I_{M-m} \end{bmatrix}\exp(-\Theta), \quad (4)$$

where M=d+N counts the total number of ports, $\Theta$ is an M×M skew-symmetric matrix with components $|\Theta(m_1,m_2)| \leq \pi$, and m=0, 1, . . . , M is a submanifold index. Consequently, the scattering matrix $S_X(p)$ of every lumped, lossless, gyrator-free N-port may be parameterized by the index m=0,1, . . . , M, the number of inductors $N_L$, the number capacitors $N_C$, and a skew-symmetric matrix $\Theta$. When necessary, the dependence of the scattering matrix $S_X(p)$ of the multiport may be made explicit: $S_X(p)=S_X(\Theta,m,N_L,N_C;p)$.

Figure 5:
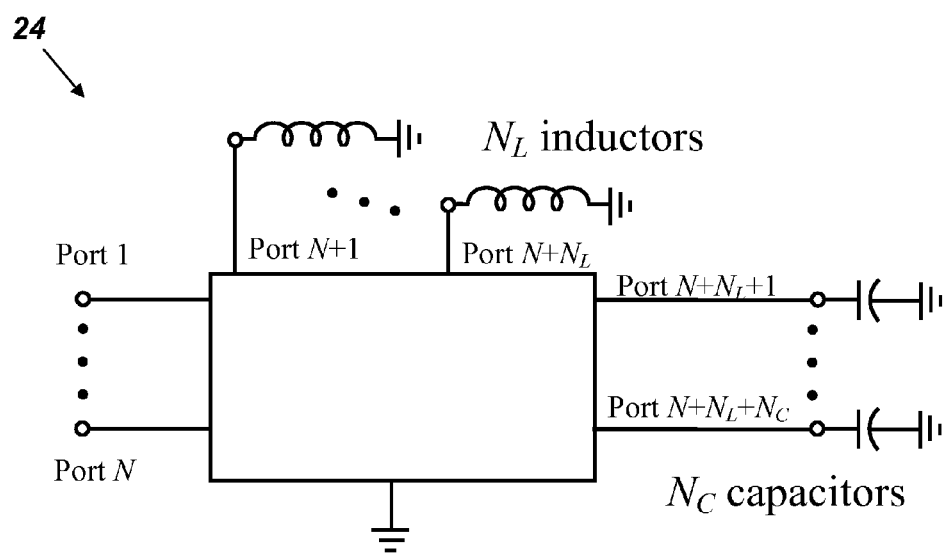
FIG. 5 is a graphical representation of a lumped, lossless, gyrator-free N-port matching circuit.

FIG. 5 is a graphical representation of a lumped, lossless, gyrator-free, N-port matching circuit 24. Ports 1 through N represent the input ports to the matching circuit 24 (i.e., those ports used to connect the T/R module 12, the transmitter 14, the antenna 16, and the receiver 18 to the matching circuit 24). Equation 1 computes the scattering matrix $S_X(p)$ at Ports 1, . . . , N. The matching circuit 24 will have a certain number of reactive elements in the form of capacitors and inductors represented by $N_C$ and $N_L$ respectively. As shown in FIG. 5, the reactive elements may be treated as additional ports to the multiport matching circuit 24. These reactive lumped elements constitute the augmented load $S_{LC}(p)$ of Equation 2. Once the reactive lumped elements are treated as additional ports the only other elements left in the circuit box shown in FIG. 5 would be the nonreactive elements (e.g., wires and transformers); this remaining circuit is referred to as the augmented matching circuit, represented by the augmented scattering matrix $S_a$ of equation 3. The multiport matching circuit 24 shown in FIG. 5 is constructed by attaching the augmented load to the augmented multiport. The augmented multiport has $N_L$ ports to connect the inductors and $N_C$ ports to connect the capacitors.

Referring back to the gyrator-free, 6-port embodiment of a matching circuit 24 shown in FIG. 3, the scattering matrix $S_X(p)$ may be partitioned as:

$$S_X(p) = \begin{bmatrix} S_{X,11}(p) & S_{X,12}(p) \\ S_{X,21}(p) & S_{X,22}(p) \end{bmatrix}; S_{X,11}(p) \text{ is } 3 \times 3; S_{X,22}(p) \text{ is } 3 \times 3.$$

Let $S_C(p)$ denote the raw circulator's scattering matrix. If the raw circulator loads the multiport as shown in FIG. 3, the resulting 3-port matching circuit consisting of Ports 1-3 has a scattering matrix:

$$S(p)=F(S_X,S_C;p)=S_{X,11}+S_{X,12}S_C(p)(I_3-S_{X,22}S_C(p))^{-1}S_{X,21} \quad (5)$$

When necessary, the dependence on the M×M skew-symmetric matrix $\Theta$, the index m=0, 1, . . . , M, and the number of inductors $N_L$, and capacitors $N_C$ may be made explicit: $S(p)=S(\Theta,m,N_L,N_C;p)$.

Figure 6:
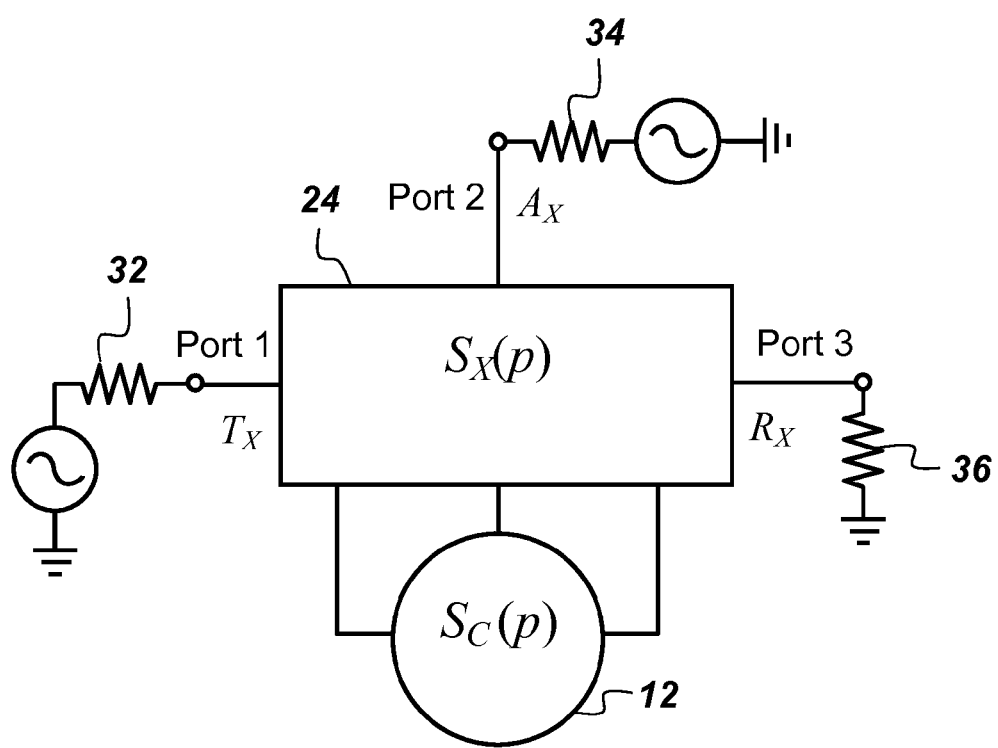
FIG. 6 is a graphical representation of a multiport matching circuit attached to a transmitter load, an antenna load, and a receiver load.

FIG. 6 is a graphical representation of a multiport matching circuit 24 attached to a transmitter load 32, an antenna load 34, and a receiver load 36. Isolation and insertion loss performance functions may be determined by the loads attached to the multiport matching circuit 24, as shown in FIG. 6. The resistor symbol is generic—the loads can be frequency-dependent, complex-valued impedances. The following subsections detail the computations to produce the isolation and insertion loss in terms of selected transducer power gains. For example, the transducer power gain from the transmitter 14 to the antenna 16 may be represented by $$G_{TA}(s_T, s_A, s_R, S) = |s_{TA,21}|^2 \frac{1-|s_T|^2}{|1-s_1 s_T|^2} \frac{1-|s_A|^2}{|1-s_{TA,22}s_A|^2},$$

where $S_{TA}$ is the scattering matrix $$S_{TA} = \begin{bmatrix} s_{TA,11} & s_{TA,12} \\ s_{TA,21} & s_{TA,22} \end{bmatrix} = \begin{bmatrix} s_{11} & s_{12} \\ s_{21} & s_{22} \end{bmatrix} + \frac{s_R}{1-s_{33}s_R}\begin{bmatrix} s_{13} \\ s_{23} \end{bmatrix}[s_{31} \; s_{32}],$$

and $s_1$ is the reflectance looking into Port 1:

$$s_1 = S_{TA,11} + S_{TA,12}S_A(1-S_{TA,22}S_A)^{-1}S_{TA,21}.$$

The transducer power gain from the antenna 16 to the receiver 18 may be represented by $$G_{AR}(s_T, s_A, s_R, S) = |s_{AR,21}|^2 \frac{1-|s_A|^2}{|1-s_2 s_A|^2}\frac{1-|s_R|^2}{|1-s_{AR,22}s_R|^2},$$

where $S_{AR}$ is the scattering matrix $$S_{AR} = \begin{bmatrix} s_{AR,11} & s_{AR,12} \\ s_{AR,21} & s_{AR,22} \end{bmatrix} = \begin{bmatrix} s_{22} & s_{23} \\ s_{32} & s_{33} \end{bmatrix} + \frac{s_T}{1-s_{11}s_T}\begin{bmatrix} s_{21} \\ s_{31} \end{bmatrix}[s_{12} \; s_{13}],$$

and the reflectance $s_2$ looking into Port 2 is $s_2 = S_{AR,11} + S_{AR,12}S_R(1-S_{AR,22}S_R)^{-1}S_{AR,21}$. The transducer power gain from the transmitter to the receiver is $$G_{TR}(s_T, s_A, s_R, S) = |s_{TR,21}|^2 \frac{1-|s_T|^2}{|1-s_1 s_T|^2}\frac{1-|s_R|^2}{|1-s_{TR,22}s_R|^2},$$

where $S_{AR}$ is the scattering matrix:

$$S_{TA} = \begin{bmatrix} s_{TR,11} & s_{TR,12} \\ s_{TR,21} & s_{TR,22} \end{bmatrix} = \begin{bmatrix} s_{11} & s_{13} \\ s_{31} & s_{33} \end{bmatrix} + \frac{s_A}{1-s_{22}s_A}\begin{bmatrix} s_{12} \\ s_{32} \end{bmatrix}[s_{21} \; s_{23}].$$

Method 10 determines the T/R performance as a function of the index $m=0, 1, \ldots, M$ given by Equation 4, the number of inductors $N_L$ and capacitors $N_C$, and the M×M skew-symmetric matrix $\Theta$:

$$\gamma(m, N_L, N_C; \Theta) = \begin{bmatrix} \gamma_1(m, N_L, N_C; \Theta) \\ \gamma_2(m, N_L, N_C; \Theta) \end{bmatrix} = \begin{bmatrix} \text{Insertion Loss} \\ \text{Isolation} \end{bmatrix}.$$

Isolation is the maximum gain from the transmitter 14 to the antenna 16:

$$\gamma_2(m, N_L, N_C; \Theta) = \max\{G_{TR}(s_T, s_A, s_R, S(m, N_L, N_C; \Theta); j\omega): \omega_{MIN} \leq \omega \leq \omega_{MAX}\},$$

where the dependence on the frequency ω is made explicit:

$$G_{TR}(s_T, s_A, s_R, S; j\omega) = $$
$$|s_{TR,21}(j\omega)|^2 \frac{1-|s_T(j\omega)|^2}{|1-s_1(j\omega)s_T(j\omega)|^2}\frac{1-|s_R(j\omega)|^2}{|1-s_{TR,22}(j\omega)s_R(j\omega)|^2}.$$

Insertion loss is the maximum loss between the transmitter 14 and the antenna 16 and the antenna 16 to the receiver 18:

$$\gamma_1(m, N_L, N_C; \Theta) = 1 - \min\{[G_{TA}(s_T, s_A, s_R, S; \quad j\omega), G_{AR}(s_T, s_A, s_R, S; j\omega)]: \omega_{MIN} \leq \omega \leq \omega_{MAX}\}.$$

The performance image, such as is displayed in FIG. 4, is the collection of possible insertion-isolation tradeoffs that the class of multiport matching circuits 24 can deliver when connected to the transmitter 14, antenna 16, receiver 18, and the raw T/R module 12:

$$\gamma(m, N_L, N_C) = \left\{\begin{bmatrix} \gamma_1(m, N_L, N_C; \Theta) \\ \gamma_2(m, N_L, N_C; \Theta) \end{bmatrix} : \Theta^T = -\Theta; \right. \quad (6)$$
$$\left. |\Theta(m_1, m_2)| \leq \pi; m_1, m_2 = 1, \ldots, M \right\}.$$

The performance image computed by Method 10 that is shown in FIG. 4 is for $N_L=1$ inductor and $N_C=2$ capacitors with m=6 as the submanifold index.

Method 10 computes the performance image associated with each sub-manifold $m=0, 1, \ldots, M$. These performance images are computed by approximating its Pareto front 30 and then filling in by line segments connecting the raw T/R module point 26 to the Pareto points 28. A Pareto point 28 may be defined as any skew-symmetric matrix $\Theta_P$ such that no skew-symmetric perturbation $\Delta\Theta$ can be found that improves the performance as $$\gamma(m, N_L, N_C; \Theta_P + \Delta\Theta) = \begin{bmatrix} \gamma_1(m, N_L, N_C; \Theta_P + \Delta\Theta) \\ \gamma_2(m, N_L, N_C; \Theta_P + \Delta\Theta) \end{bmatrix} \leq$$
$$\begin{bmatrix} \gamma_1(m, N_L, N_C; \Theta_P) \\ \gamma_2(m, N_L, N_C; \Theta_P) \end{bmatrix} = \gamma(m, N_L, N_C; \Theta_P),$$

where one of the inequalities is strict. Let P(m) denote the collection of all such Pareto points 28. The Pareto front 30 is the image of these Pareto points:

$$\gamma(m, N_L, N_C; P(m)) = \cup\{\gamma(m, N_L, N_C; \Theta_P): \Theta_P \in P(m)\}.$$

The performance image of the mth submanifold is approximated by mapping the line segments that connect the raw T/R module 12's skew-symmetric matrix $\Theta_0$, depicted in FIG. 4 as the raw T/R module point 26, to each skew-symmetric matrix that is a Pareto point $\Theta_P \in P(m)$:

$$\gamma(m, N_L, N_C) \approx \cup\{\gamma(m, N_L, N_C; (1-t)\Theta_0 + t\Theta_P): 0 \leq t \leq 1; \Theta_P \in P(m)\},$$

The skew-symmetric matrix $\Theta_0$ is selected so that its associated 6×6 multiport acts like the identity mapping. This skew-symmetric matrix $\Theta_0$ is computed as follows. If $S_O$ denotes scattering matrix of the 6×6 multiport $$S_O = \begin{bmatrix} 0 & I_3 \\ I_3 & 0 \end{bmatrix},$$

this 6×6 multiport maps the raw circulator's scattering matrix $S_C(p)$ to itself using Equation 5:

$$S_C(p) = F(S_O, S_C; p) = S_C(p)$$

The scattering matrix $S_O$ belongs to the class of lumped, lossless, gyrator-free multiport matching circuits 24 because $S_O$ is symmetric ($S_O^T = S_O$). In particular, by selecting the augmented scattering matrix $$S_{a,0} = \begin{bmatrix} S_O & 0 \\ 0 & I_d \end{bmatrix}; (d = N_L + N_C),$$

the 6×6 multiport's scattering matrix $S_0$ can be obtained by loading the augmented scattering matrix $S_{a,0}$ with the augmented load $S_{LC}(p)$ from Equation 2 using the mapping of Equation 1:

$$S_0 = F(S_a, S_{LC}; p)$$

This augmented scattering matrix $S_{a,0}$ can be obtained by solving the Equation 4 for the skew-symmetric matrix $$S_{a,0} = \begin{bmatrix} S_0 & 0 \\ 0 & I_d \end{bmatrix} = \exp(\Theta_0) \begin{bmatrix} I_m & 0 \\ 0 & -I_{M-m} \end{bmatrix} \exp(-\Theta_0), \quad (7)$$

where $M = d + 6$ counts the total number of ports on the augmented multiport matching circuit 24. There are d ports for loading the inductors and capacitors, 3 ports for loading the raw T/R module 12, and 3 ports to serve as the input ports.

The performance image of the mth submanifold is approximated by mapping the line segments that connect $\Theta_0$ to each Pareto point $\Theta_P \in P(m)$. Each line segment is parameterized as $$t \mapsto \gamma(1-t)\Theta_0 + t\Theta_P,$$

for $0 \le t \le 1$. Mapping these line segments under the performance function (Equation 6) produces a curve parameterized in the insertion-isolation plane as $$t \mapsto \gamma(m, N_L, N_C; (1-t)\Theta \mathrm{hd}\ 0 + t\Theta_P)$$

The performance image is approximated by computing the union of these curves over all the Pareto points:

$$\gamma(m, N_L, N_C) \approx \cup \{\gamma(m, N_L, N_C; (1-t)\Theta_0 + t\Theta_P) : 0 \le t \le 1 \\ \Theta_P \in P(m)\}$$

Regarding the population of the performance image, suppose one has two scattering matrices: $S_A = \exp(\Theta_A)$ and $S_B = \exp(\Theta_B)$. Because the skew-symmetric matrices can be connected by the "line" $\Theta(t) = (1-t)\Theta_A + t\Theta_B$; $0 \le t \le 1$ the exponential lifts this line to a curve connecting the given scattering matrices: $S(t) = \exp(\Theta(t))$. This curve starts at $S_A = S(0)$ and ends at $S_B = S(1)$. For example, if $$\Theta_A = \begin{bmatrix} 0 & 0 \\ 0 & 0 \end{bmatrix} \Rightarrow$$

$$S_A \begin{bmatrix} 1 & 0 \\ 0 & 1 \end{bmatrix} \text{ and } \Theta_B = \begin{bmatrix} 0 & 1 \\ -1 & 0 \end{bmatrix} \Rightarrow S_B = \begin{bmatrix} 0.5403 & 0.8415 \\ -0.8415 & 0.5403 \end{bmatrix},$$

then the line in the skew-symmetric matrices is $$\Theta(t) = t \begin{bmatrix} 0 & 1 \\ -1 & 0 \end{bmatrix}.$$

The line may be lifted to the curve in the scattering matrices as follows:

$$S(t) = \begin{bmatrix} \cos(t) & \sin(t) \\ -\sin(t) & \cos(t) \end{bmatrix}.$$

Let $\Theta_0$ denote the unmatched circulator's "logarithm" and let $\Theta_P$ denote a Pareto optimal solution. The associated scattering matrices are $S_0 = \exp(\Theta_0)$ and $S_P = \exp(\Theta_P)$. Each Pareto point 28 shown in FIG. 4 (i.e., white diamonds) marks such a scattering matrix. The curve from the unmatched circulator to an optimally matched circulator is $S(t) = \exp((1-t)\Theta_0 + t\Theta_P)$. As $t \to 1$, the scattering matrix $S(t) \to S_P$. By densely sampling the t's approaching 1, we can get a nearly optimal matched T/R module. These are the black dots in the performance image. By densely sampling near a few Pareto points 28, the performance image rapidly populates with the black dots. The lines connecting the dots are optional and may be produced by a plotting command requesting that the dots be connected with lines.

The following is a list of inputs that may be used by Method 10 to generate a Pareto front on a performance image of a given T/R module 12 connected to a given antenna 16, transmitter 14, and receiver 18 over a bandwidth $f_b$:

$f$: frequency vector of length; real $N_f \times 1$ array.

$S_C$: scattering matrix of the 3-port load indexed by frequency; complex $3 \times 3 \times N_f$ array.

$N_C$: number of capacitors.

$N_L$: number of inductors.

m: index of the submanifold; $m = 1:M-1$; $M = N_C + N_L + 6$.

$s_T$: reflectance of the transmitter indexed by frequency; complex $N_f \times 1$ array.

$s_A$: reflectance of the antenna indexed by frequency; complex $N_f \times 1$ array.

$s_R$: reflectance of the receiver indexed by frequency; complex $N_f \times 1$ array.

$N_{rep}$: maximum number of random samples.

$N_{max}$: maximum number of function calls.

$N_w$: number of weight vectors for a multiobjective optimization routine.

$\gamma_{1,max}$: maximum insertion loss to select starting points for a multiobjective optimizer tool.

$N_t$: number of points to plot on each line segment.

The following is an outline procedure of how the Pareto front 30 may be computed by the Method 10 given the inputs above. First, randomly sample the M×M skew-symmetric matrices to find those matrices with insertion loss less than $\gamma_{1,max}$; break after $N_{rep}$ matrices are collected or $N_{max}$ function calls are made. If no matrices can be found that deliver insertion loss less than $\gamma_{1,max}$, break and inform the user. Otherwise, those skew-symmetric matrices that can deliver an insertion loss not exceeding are collected in the set $\Theta_{start}$. These matrices are the starting point for a multi-objective optimizer, such as MATLAB®'s goal attainment tool.

$\Theta_{start} = \{\ \}$; $n_f = 0$; $n_r = 0$;
while $n_r \le N_{rep}$ or $n_f \le N_{max}$
    $\Theta = \text{rand}(\ )$;
    Randomly generate an M×M skew-symmetric matrix with components $|\Theta(m_1, m_2)| \le \pi$.
    $n_f \leftarrow n_f + 1$;
    if $\gamma_1(m, N_L, N_C; \Theta) \le \gamma_{1,max}$ ; this matrix has less than $\gamma_{1,max}$ insertion loss
    $\Theta_{start} \leftarrow \Theta_{start} \cup \{\Theta\}$; add $\Theta$ to the starting points
    $n_r \leftarrow n_r + 1$;
    end
end
if $n_r = 0$; break "no starting points available"; end The Pareto points 28 may be computed by sweeping over the M×M skew-symmetric matrices with bounded compo- -nents |Θ|≤π starting from each skew-symmetric matrix in the starting set $\Theta_{start}$ and employing every weight vector. The weight vectors have the form $$\begin{bmatrix} \cos(\theta(n_w)) \\ \sin(\theta(n_w)) \end{bmatrix}; n_w = 1, \ldots, N_w,$$

where the angles are linearly spaced between 1° and 89°. These computations produce the set $\Theta_{opt} = \{\Theta_P(n_e,n_w)\}$ containing the M×M skew-symmetric matrices that are the numerical solutions to the multiobjective optimization routine indexed by the starting points $n_e=1, \ldots, N_e$ and the weight vectors $n_w=1, \ldots, N_w$.

$N_e$=size($\Theta_{start}$); Count the number of starting points
for $n_e$=1: $N_e$
  for $n_w$=1: $N_w$
    minimize u(Θ)>0 over the real M×M matrices
    subject to the constraints
    1. $\Theta^T$x−Θ; skew-symmetric
    2. |Θ|≤π; components bounded by pi.

$$\left( \begin{bmatrix} \gamma_1(m, N_L, N_C; \Theta) \\ \gamma_2(m, N_L, N_C; \Theta) \end{bmatrix} - \begin{bmatrix} \cos(\phi(n_w)) \\ \sin(\phi(n_w)) \end{bmatrix} \right) u(\Theta) \leq \begin{bmatrix} 0 \\ 0 \end{bmatrix}$$

Starting from $\Theta(n_e) \in \Theta_{start}$
    Store the minimum: $\Theta_{opt} \leftarrow \Theta_P(n_e,n_w)$;
  end
end Each skew-symmetric matrix in $\Theta_{opt} = \{\Theta_P(n_e,n_w)\}$ can be connected to the raw T/R module point 26, or $\Theta_0$, by the line segment $$t \mapsto (1-t)\Theta_0 + t\Theta_P, \ (0 \leq t \leq 1).$$

The image of this line in the insertion-isolation plane is the set $$\{\gamma(m, N_L, N_C; (1-t)\Theta_0 + t\Theta_P): 0 \leq t \leq 1\}.$$

Figure 7:
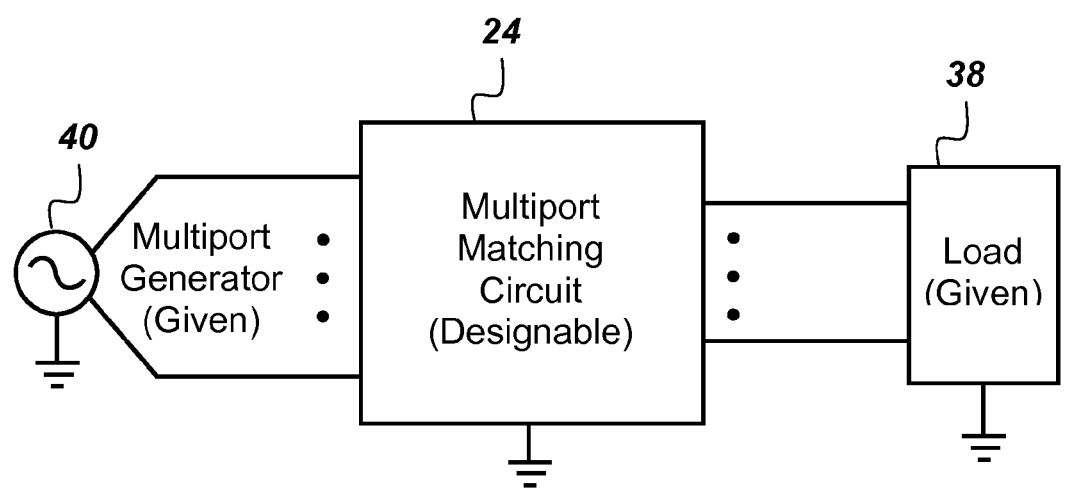
FIG. 7 is an illustration of the general multiport matching circuit design problem.

This set will be densely sampled as t approaches 1 because of the sensitivity of the Pareto points 28. In sum, the following steps may be followed to produce a performance image, such as is shown in FIG. 4: Compute the skew-symmetric matrix $\Theta_0$ of the identity multiport by solving Equation 7 for $\Theta_0$; Plot the raw T/R module point 26, $\gamma(m,N_L,N_C; \Theta_0)$. This is the white dot shown in FIG. 4; and Plot the image of the line connecting the $\Theta_0$ to each point in $\Theta_{opt}$. Only the line segments from t=0.9 to t=1 will be plotted.

for $n_e$=1: $N_e$
  for $n_w$=1: $N_w$
    plot $\{\gamma(m,N_L,N_C;(1-t)\Theta_0+t\Theta_P(n_e,n_w)): t \in$ linespace (0.9,1,$N_t$)$\}$;
  end
end FIG. 7 illustrates the general multiport matching problem aided by method 10. The multiport load 38 and the multiport generator 40 are given. The multiport matching circuit 24 connects the generator 40 to the load 38. The multiport matching problem seeks multiport matching circuits 24 that optimize one or more objective functions over the desired frequency band. This Method 10 can be generalized to estimate the optimal performance attainable by the class of reciprocal multiport matching circuits 24 containing a specified number of inductors and capacitors (the lumped elements) connected only by wires and transformers in all possible topologies. There are no gyrators. That is, the multiport is gyrator-free or reciprocal.

Figure 8:
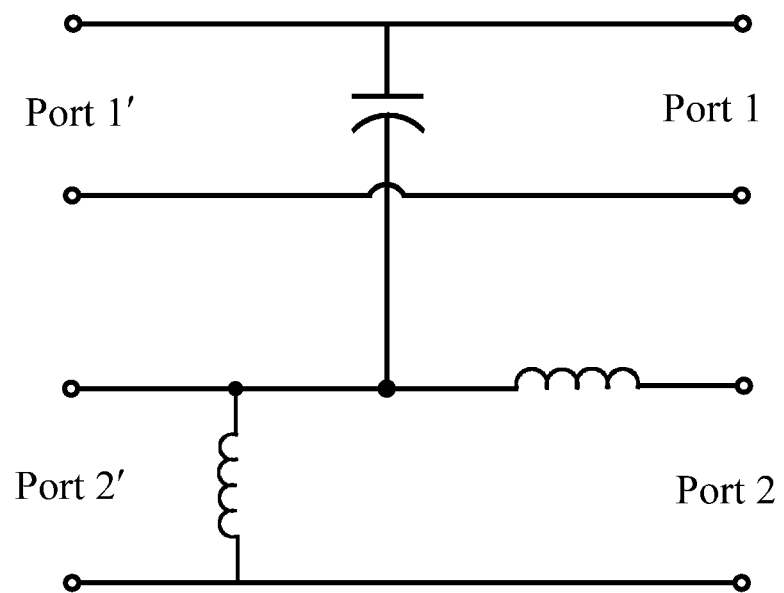
FIG. 8 is a schematic of a simple three-stage multiport ladder.

FIG. 8 is a schematic of a simple 3-stage multiport ladder. The performance bounds determined by Method 10 can direct circuit designs and benchmark practical engineering circuits. For example, the simple multiport ladders use a single lumped element (inductor or capacitor) in ladder stage (series or shunt). The ladder shown in FIG. 8 connects Port 1 and 2 on the right to Ports 1' and 2' on the left. Matching a 2-port load over all such 3-stage ladders requires optimizing over $1,000=10^3$ ladder topologies. More generally, matching a 2-port load over these N-stage ladders requires matching over $10^N$ ladder topologies (e.g., there are 10,000 topologies of simple 2-port ladders having 5 stages). Matching a 3-port load requires matching over $18^N$ ladder topologies (e.g., there are 1,889,568 topologies of simple 3-port ladders having 5 stages). In contrast, this gyrator-free matching method 10 computes performance bounds attainable from the class lumped, lossless, and gyrator-free multiport matching circuits 24 containing a specified number of lumped elements. The optimization covers all topologies—the specific number of lumped elements is fixed. Because this class of multiport matching circuits 24 contains all the simple multiport ladders with the corresponding number of lumped elements, this gyrator-free matching method 10 can direct the design of multiport ladders with respect to the number of stages (e.g., determine the minimum number of stages) or benchmark the performance of a specific ladder (e.g., measuring the ladder's performance against the class optimum).

A straight-forward computation of the performance image is to densely sample the M×M skew-symmetric matrices Θ and collect the resulting image points $\gamma(m, N_L, N_C; \Theta)$. A drawback with this approach is the M×M skew-symmetric matrices are a real linear space of dimension M×(M−1)/2. For example, the performance image of FIG. 4 was computed using the 9×9 skew-symmetric matrices Θ. These 9×9 skew-symmetric matrices form a 36-dimensional space. With 1,000 samples per dimension, this dense sampling approach requires $10^{108}$ samples over these 9×9 skew-symmetric matrices. Even with only 10 samples per dimension, $10^{36}$ samples are required. Consequently, the dense sampling approach is best suited for low-dimensional problems.

From the above description of Method 10, it is manifest that various techniques may be used for implementing the concepts of Method 10 without departing from its scope. The described embodiments are to be considered in all respects as illustrative and not restrictive. It should also be understood that Method 10 is not limited to the particular embodiments described herein, but is capable of many embodiments without departing from the scope of the claims.

We claim:

1. A method for identifying performance bounds of a transmit-receive (T/R) module over a bandwidth $f_b$:
  providing an antenna, a transmitter, and a receiver all with known reflectance within the bandwidth $f_b$;
  connecting the transmitter, the antenna, and the receiver to the T/R module without a matching circuit and measuring the following over the bandwidth $f_b$:
    the isolation between the transmitter and the receiver,
    the insertion loss from the transmitter to the antenna, and
    the insertion loss from the antenna to the receiver;

plotting the minimum measured isolation and the maximum measured insertion loss on a performance image graph as a raw T/R module point;

mathematically representing a multiport matching circuit configured to be connected to the T/R module, the antenna, the transmitter, and the receiver, wherein the matching circuit contains no gyrators and comprises a fixed number of capacitors and inductors;

using the mathematical representation of the matching circuit to approximate a Pareto front comprised of a plurality of Pareto points;

connecting each Pareto point to the raw T/R module point on the performance image graph such that the performance image becomes a visual representation of the performance bounds of a class of multiport matching circuits having $N_C$ capacitors and $N_L$ inductors;

identifying from the performance image a best possible insertion loss and isolation that could be obtained by connecting the transmitter, the antenna, and the receiver to the T/R module with any matching circuit from the class of multiport matching circuits;

designing an optimized matching circuit based on an overall tradeoff between the best possible insertion loss and isolation from the class of multiport matching circuits to meet predefined performance criteria; and connecting the T/R module, the antenna, the transmitter, and the receiver to the optimized matching circuit.

2. The method of claim 1, wherein each Pareto point may be defined as any skew-symmetric matrix $\Theta_P$, such that no skew-symmetric perturbation $\Delta\Theta$ can be found that improves the following function $\gamma$ as $$\gamma(m, N_L, N_C; \Theta_P + \Delta\Theta) = \begin{bmatrix} \gamma_1(m, N_L, N_C; \Theta_P + \Delta\Theta) \\ \gamma_2(m, N_L, N_C; \Theta_P + \Delta\Theta) \end{bmatrix} \leq$$

$$\begin{bmatrix} \gamma_1(m, N_L, N_C; \Theta_P) \\ \gamma_2(m, N_L, N_C; \Theta_P) \end{bmatrix} = \gamma(m, N_L, N_C; \Theta_P)$$

where one of the inequalities is strict, and where m is an index.

3. The method of claim 2, wherein the Pareto front is the image of the collection of all Pareto points P(m) according to the following equation:

$$\gamma(m, N_L, N_C; P(m)) = \cup\{\gamma(m, N_L, N_C; \Theta_P) : \Theta_P \in P(m)\}.$$

4. The method of claim 3, wherein the multiport matching circuit is mathematically represented by a N×N scattering matrix $S_x(p)$, where N represents the number of ports of the matching circuit and p denotes the complex frequency $p=\sigma+j\omega$.

5. The method of claim 4, wherein the scattering matrix $S_X(p)$ is defined as follows:

$$S_X(p) = F(S_a, S_{LC}; p) = S_{a,11} + S_{a,12} S_{LC}(p)(I_d - S_{a,22} S_{LC}(p))^{-1} S_{a,21},$$

where $S_{LC}(p)$ is a diagonal scattering matrix modeling the fixed number of $N_L$ inductors and $N_C$ capacitors as:

$$S_{LC}(p) = \frac{p-1}{p+1} \begin{bmatrix} I_{N_L} & 0 \\ 0 & -I_{N_C} \end{bmatrix},$$

where $S_a$ is an augmented scattering matrix, which is a constant, orthogonal, symmetric matrix partitioned as:

$$S_a = \begin{bmatrix} S_{a,11} & S_{a,12} \\ S_{a,21} & S_{a,22} \end{bmatrix}; \quad S_{a,11} \text{ is } N \times N; \quad S_{a,22} \text{ is } d \times d,$$

where d is the degree of the matching circuit equal to $N_L + N_C$.

6. The method of claim 1, further comprising the step of populating the performance image with points determined by densely sampling around the Pareto points.

7. The method of claim 1, wherein the matching circuit is mathematically represented as being lossless.

8. The method of claim 1, wherein the antenna comprises a plurality of antennas.

9. The method of claim 1, wherein the T/R module is a three-port circulator.

10. The method of claim 1, wherein the T/R module is a four-port circulator.

11. A method for identifying the performance bounds of a transmit-receive (T/R) module over a given bandwidth $f_b$, comprising the following steps:

providing a T/R module;

identifying a given antenna, a given transmitter, and a given receiver that are to be connected to the T/R module, wherein the antenna, the transmitter, and the receiver all have known reflectance within the bandwidth $f_b$;

parameterizing a multiport matching circuit by generating M submanifolds of orthogonal scattering matrices for the multiport matching circuit, wherein the multiport matching circuit contains no gyrators and comprises a fixed number $N_C$ of capacitors and a fixed number $N_L$ of inductors;

sweeping over the submanifolds of orthogonal scattering matrices to identify isolation and insertion loss data for each of a plurality of Pareto points;

displaying a Pareto front comprised of the Pareto points on a performance image plot showing the possible isolation and insertion loss tradeoffs for a class of multiport matching circuits having $N_C$ capacitors and $N_L$ inductors when connected to the T/R module, the given antenna, the given transmitter, and the given receiver;

identifying from the performance image a best possible insertion loss and isolation that could be obtained by connecting the given transmitter, the given antenna, and the given receiver to the T/R module with any matching circuit from the class of multiport matching circuits;

selecting an optimized matching circuit based on an overall tradeoff between the best possible insertion loss and isolation from the class of multiport matching circuits to meet predefined performance criteria; and connecting the T/R module, the antenna, the transmitter, and the receiver to the optimized matching circuit.

12. The method of claim 11, wherein the matching circuit is lossless.

13. The method of claim 11, wherein the antenna comprises a plurality of antennas.

14. The method of claim 11, wherein the T/R module is a three-port circulator.

15. The method of claim 11, wherein the T/R module is a four-port circulator.

16. The method of claim 11, wherein the sweeping step further comprises:

randomly sampling M×M skew-symmetric matrices to find those matrices with insertion loss less than a threshold $\gamma_{1,max}$ until a desired number $N_{rep}$ of matrices are collected or a predefined number $N_{max}$ of function calls are made;

collecting those skew-symmetric matrices with an insertion loss less than $\gamma_{1,max}$ in a set $\Theta_{start}$;

sweeping over the M×M skew-symmetric matrices with bounded components $|\Theta| \leq \pi$ starting from each skew-symmetric matrix in the starting set $\Theta_{start}$; and employing weight vectors having the form:

$$\begin{bmatrix} \cos(\theta(n_w)) \\ \sin(\theta(n_w)) \end{bmatrix}; n_w = 1, \ldots, N_w,$$

wherein angles are linearly spaced between 1° and 89°, to produce a set $\Theta_{opt} = \{\Theta_P(n_e, n_w)\}$ containing the M×M skew-symmetric matrices indexed by the starting points $n_e = 1, \ldots, N_e$ and the weight vectors $n_w = 1, \ldots, N_w$.

17. The method of claim 16, further comprising the steps of:

connecting each skew-symmetric matrix in $\Theta_{opt} = \{\Theta_P(n_e, n_w)\}$ to a raw circulator matrix $\Theta_0$ by the line segment $t \mapsto (1-t)\Theta_0 + t\Theta_P$, $(0 \leq t \leq 1)$, such that the image of the line in an insertion-isolation plane is the set $$\{\gamma(m, N_L, N_C; (1-t)\Theta_0 + t\Theta_P) : 0 \leq t \leq 1\}.$$

18. A method for identifying the performance bounds of a transmit-receive (T/R) module over a given bandwidth $f_b$, comprising the following steps:

providing a T/R module;

providing an antenna, a transmitter, and a receiver all with known operational characteristics within the bandwidth $f_b$;

representing mathematically with matrices a class of lumped, lossless, gyrator-free, multiport matching circuits having $N_C$ capacitors and $N_L$ inductors;

exploiting the matrices to simultaneously solve insertion loss and isolation objective functions to determine transmitter-receiver isolation data, transmitter-antenna insertion loss data, and antenna-receiver insertion loss data for the class of multiport matching circuits;

populating a performance image with a Pareto front comprised of a plurality of Pareto points such that the performance image displays the possible isolation and insertion loss tradeoffs for the class of multiport matching circuits having $N_C$ capacitors and $N_L$ inductors when connected to the T/R module, the antenna, the transmitter, and the receiver;

identifying from the performance image a best possible insertion loss and isolation that could be obtained by connecting the transmitter, the antenna, and the receiver to the T/R module with any matching circuit from the class of multiport matching circuits;

designing an optimized matching circuit based on an overall tradeoff between the best possible insertion loss and isolation from the class of multiport matching circuits to meet predefined performance criteria; and connecting the T/R module, the antenna, the transmitter, and the receiver to the optimized matching circuit.

19. The method of claim 18, further comprising the step of determining whether the combination of the T/R module, the antenna, the transmitter, and the receiver can meet predefined performance criteria based on the performance image.

20. The method of claim 18, further comprising the step of generating multiple performance images corresponding to different combinations of capacitors and inductors.

* * * * *